(12) United States Patent
Wang (10) Patent No.: US 8,699,558 B1
(45) Date of Patent: Apr. 15, 2014

(54) DECOUPLING AND PIPELINING OF MULTIPLEXER LOOP IN PARALLEL PROCESSING DECISION-FEEDBACK CIRCUITS

(75) Inventor: Nanyan Wang, Coquitlam (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 127 days.

(21) Appl. No.: 13/404,754

(22) Filed: Feb. 24, 2012

Related U.S. Application Data (60) Provisional application No. 61/446,717, filed on Feb. 25, 2011.

(51) Int. Cl.
*H03H 7/40* (2006.01)

(52) U.S. Cl.
USPC .......................................... 375/233

(58) Field of Classification Search
USPC .......... 375/233, 229, 346, 358; 370/301, 323; 708/401, 535
See application file for complete search history.

(56) References Cited

U.S. PATENT DOCUMENTS

| | | | |
|---|---|---|---|
| 6,192,072 B1 | 2/2001 | Azadet et al. | |
| 6,363,112 B1 | 3/2002 | Azadet et al. | |
| 7,239,652 B2 | 7/2007 | Parhi | |
| 2009/0265406 A1 * | 10/2009 | Bosshart | 708/323 |

OTHER PUBLICATIONS

Parhi, "Design of Multigigabit Multiplexer-Loop-Based Decision Feedback Equalizers", IEEE Transactions on Very Large Scale Integration (VLSI) Systems, vol. 13, No. 4, Apr. 2005, pp. 489-493.

Lin et al, "High-Performance VLSI Architecture of Decision Feedback Equalizer for Gigabit Systems", IEEE Transactions on Circuits and Systems II, vol. 53, No. 9, Sep. 2006, pp. 911-915.

* cited by examiner

*Primary Examiner* — Khai Tran (74) *Attorney, Agent, or Firm* — Dennis R. Haszko (57) ABSTRACT

This invention discloses circuit and methods to decouple and pipeline block decision feedback multiplexer (MUX) loop in parallel processing decision feedback circuits. In one embodiment of this invention, a block decision feedback MUX loop consists of a pipelined intra-block decision feedback MUX stage and an inter-block decision feedback MUX stage to handle intra-block decision feedback selection and inter-block decision feedback selection separately. In the pipelined intra-block decision feedback stage, inter-block dependency is eliminated to enable pipelining. In another embodiment of this invention for moderately timing-critical parallel processing decision feedback circuits, a block decision feedback MUX loop is piecewise split into multiple series connected segments that each segment contains parallel branches. The intra-segment decision feedback selections of different segments are decoupled and processed in parallel. The selections of final decision signals of different branches in a segment are parallelized.

24 Claims, 9 Drawing Sheets

DECOUPLING AND PIPELINING OF MULTIPLEXER LOOP IN PARALLEL PROCESSING DECISION-FEEDBACK CIRCUITS

CROSS REFERENCE TO RELATED APPLICATIONS

This application claims the benefit of priority of U.S. Provisional Patent Application No. 61/446,717 filed Feb. 25, 2011, which is incorporated herein by reference in its entirety.

FIELD

The present disclosure relates generally to electronic signal processing. More particularly, the present disclosure relates to parallel processing decision feedback circuits.

BACKGROUND

Parallel processing has been widely used in modern high-speed communication systems to improve system throughput. One of the major challenges in parallel processing is to speed up the block decision feedback loop in a parallel processing decision feedback circuit. In decision feedback circuits such as decision feedback equalizer, decision feedback decoder, differential pulse code modulation, etc., current and past decisions are used to adjust the detection or decoding of subsequent symbols. In a parallel processing decision feedback circuit, serial input data is buffered to form a block of N data samples and processed by N parallel branches that each contain a decision feedback unit. Since the decision in each branch depends on the decisions of L preceding branches, the N decision feedback units are series connected and form a timing-critical block decision feedback loop. The latency of a block decision feedback loop limits both the operating clock frequency and the block size of a parallel processing decision feedback circuit which heavily impact the speed and throughput of a system.

Figure 1:
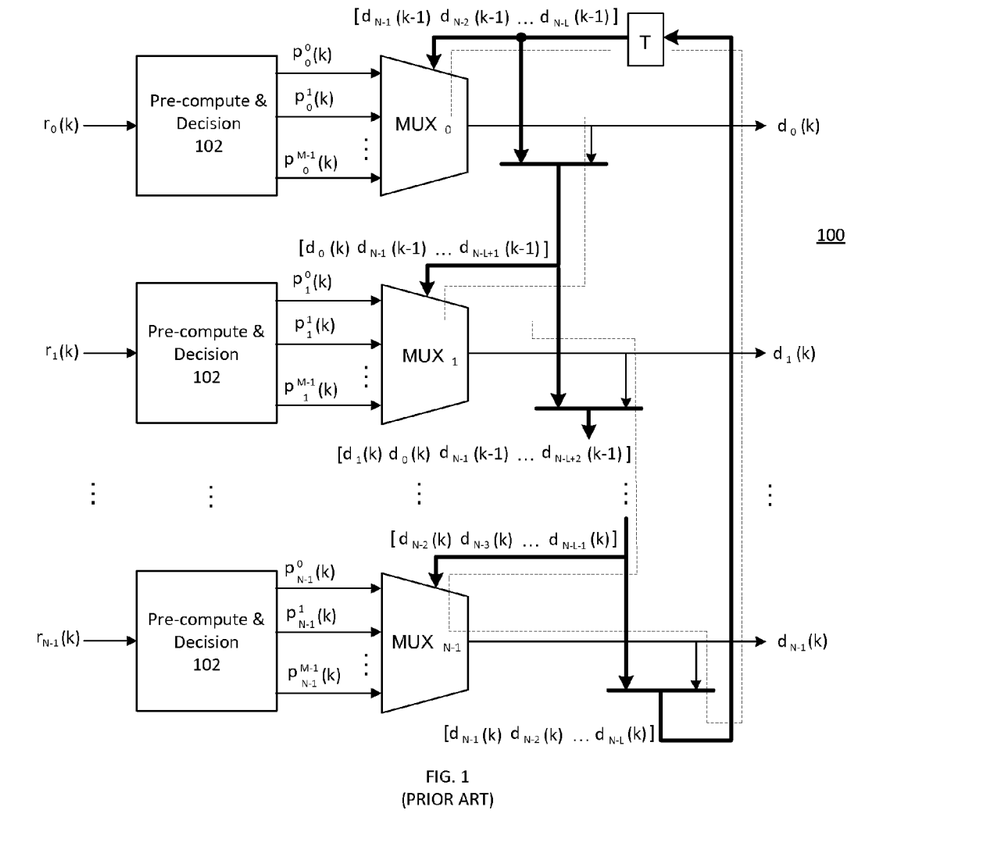
FIG. 1 is a typical pre-computation based parallel processing decision feedback circuit.

One technique used to reduce the latency of a block decision feedback loop is to pre-compute all possible decision values and then use a block decision feedback multiplexer ("MUX") loop to select the final decision values. In the following exemplary description, the symbols to be detected by a parallel processing decision feedback circuit are assumed to be binary, i.e., chosen from an alphabet of size A=2. A typical pre-computation based parallel processing decision feedback circuit 100 is shown in FIG. 1. It consists of N parallel branches to process N input signal values $r_0(k)$ $r_1(k)$ ..., $r_{N-1}(k)$ and generate N output signal values $d_0(k)$ $d_1(k)$ ..., $d_{N-1}(k)$ in parallel where k is the discrete time index. The decision of the nth branch's output signal values $d_n(k)$ for n=0, 1, ..., N−1 depends on L decisions immediately preceding it. All possible decision values of $d_n(k)$, i.e., $p_n^0(k)$ $p_n^1(k)$ ..., $p_n^{M-1}(k)$ where $M=2^L$, are pre-computed at pre-compute and decision stage 102 outside a block decision feedback MUX loop in order to reduce the loop latency. The block decision feedback MUX loop consists of N series connected M-to-1 MUXs which forms a timing critical path as shown in the dashed lines in FIG. 1. As one of ordinary skill will appreciate, the critical path is the path with the longest computation time and zero delay (i.e., the path for branch $r_{N-1}(k)$.)

In a synchronous parallel processing decision feedback circuit, the final output signal values of each different branch must be ready before a common clock event of sampling flip-flops. Each MUX's output signal value depends not only on the preceding decisions of the block in the current clock cycle but also on the decisions of the past block in the previous clock cycle. The inter-block dependency and the intra-block dependency together lead to intra-clock-cycle dependency which requires the overall latency of a block decision feedback MUX loop be less than one clock period, i.e., $$N\tau_{MUX} + t_{su} + t_h < \frac{1}{f_{clk}} \quad (1)$$

Where $f_{clk}$ is the operating clock frequency, $T_{MUX}$ is the latency of a M-to-1 MUX, $t_{su}$ is the setup time of a flip-flop, and $t_h$ is the hold time of a flip-flop. Without loss of generality, we ignore $t_{su}$ and $t_h$. Equation (1) can be reformulated into $$f_{clk} < \frac{1}{N\tau_{MUX}} \quad (2)$$

As can be seen from Equation (2), the iteration bound of a block decision feedback MUX loop is approximately $N\tau_{MUX}$. As one of ordinary skill will appreciate, the iteration bound is the maximum loop bound for a given circuit, where the loop bound for a particular feedback loop is the lower bound on the loop computation time. The loop bound is typically expressed as the quotient of the loop's computation time divided by the number of delays in the loop.

In addition, both the clock operating frequency and the block size of a parallel processing decision feedback circuit 100 are limited by the latency of the block decision feedback MUX loop.

It is, therefore, desirable to mitigate at least some of the foregoing problems by providing a parallel processing feedback circuit with an increased operating clock frequency and an increased block size.

SUMMARY

It is an object of the present disclosure to obviate or mitigate at least one disadvantage of previous synchronous circuits and methods of parallel processing.

In a first aspect, the present disclosure provides a method of parallel processing an input block of N branches, by pre-computing N input signal vectors each having M entries, each entry being a possible value of one of the N branches, evaluating all possible values of the input signal vectors according to a set of M pre-assigned decision feedback signals to provide M intra-block decision signal vectors, each intra-block decision signal vector having N entries, and processing each of the entries of each of the intra-block decision signal vectors according to an inter-block decision feedback signal to select N outputs for the input block, the inter-block decision feedback signal being based on outputs for a previous block.

In a further embodiment, the method includes outputting the selected N outputs for the input block as an output block.

In yet another aspect, evaluating all possible values of the input signal vectors includes evaluating possible values of one of the input signal vectors according to one of the pre-assigned decision feedback signals to select a first value of one of the intra-block decision signal vectors, updating the one of the pre-assigned decision feedback signals to incorporate the first value, and evaluating possible values of a next one of the input signal vectors according to the updated pre-assigned decision feedback signal to select a next value of the one of the intra-block decision signal vectors.

In still a further embodiment, the method includes repeating the steps of updating the pre-assigned decision feedback signal and evaluating possible values of a next one of the input signal vectors for each of the input signal vectors.

In a sixth aspect of the present disclosure, the methods disclosed herein include synchronizing the outputs of the selected values of the one of the intra-block decision signal vectors.

In another embodiment, the methods include generating a next inter-block decision feedback signal based on the outputs for the input block.

Further embodiments of the present disclosure provide a synchronous circuit for parallel processing digital input signal vectors of an input block having N entries, having a pre-computation stage for pre-computing N input signal vectors each having M entries, each entry being a possible value of one of the N branches, a pipelined intra-block decision feedback stage for evaluating all possible values of the input signal vectors according to a set of M pre-assigned decision feedback signals to provide M intra-block decision signal vectors, each intra-block decision signal vector having N entries, and an inter-block decision feedback stage for processing each of the entries of each of the intra-block decision signal vectors according to an inter-block decision feedback signal to select N outputs for the input block, the inter-block decision feedback signal being based on outputs for a previous block.

In certain embodiments, the pipelined intra-block decision feedback stage includes M parallel MUX chains.

In still a further aspect, the M parallel MUX chains are for evaluating possible values of one of the input signal vectors according to one of the pre-assigned decision feedback signals to select a first value of one of the intra-block decision signal vectors, updating the one of the pre-assigned decision feedback signals to incorporate the first value, and evaluating possible values of a next one of the input signal vectors according to the updated pre-assigned decision feedback signal to select a next value of the one of the intra-block decision signal vectors.

In yet another aspect, the inter-block decision feedback stage includes N parallel MUX's.

Still further embodiments provide a method of parallel processing an input block of N branches, including pre-computing N input signal vectors each having M entries, each entry being a possible value of one of the N branches, evaluating all possible values of a first subset of the input signal vectors according to an inter-block decision feedback signal vector to select outputs for the first subset of the input signal vectors, the inter-block decision feedback signal vector being based on outputs of a previous block, evaluating all possible values of a second subset of the input signal vectors according to a set of M pre-assigned decision feedback signals to provide a set of M intra-block decision signal vectors each having M entries, and processing each of the entries of the set of M intra-block decision signal vectors according to the outputs of the first subset to select an output for each of the set of M intra-block decision signal vectors.

In some embodiments, evaluating all possible values of the second subset of the input signal vectors involves evaluating possible values of one of the subset of input signal vectors according to one of the set of pre-assigned decision feedback signals to select a first value of one of the set of intra-block decision vectors, updating the one of the set of pre-assigned decision feedback signals to incorporate the first value, and evaluating possible values of a next one of the input signal vectors according to the updated pre-assigned decision feedback signal to select a next value of the one of the intra-block decision signal vectors.

In a further aspect, the methods provided by the present disclosure include evaluating all possible values of a third subset of the input signal vectors according to a next set of M pre-assigned decision feedback signals to provide a next set of M intra-block decision signal vectors each having M entries and processing each of the entries of the next set of M intra-block decision signal vectors according to the outputs of the second subset to select an output for each of the next set of M intra-block decision signal vectors.

Still further embodiments provide a synchronous circuit for parallel processing digital input signal vectors of an input block having N entries, including a pre-computation stage for pre-computing N input signal vectors each having M entries, each entry being a possible value of one of the N branches, a first segment for evaluating all possible values of a first subset of the input signal vectors according to an inter-block decision feedback signal vector to select output values for the first subset of the input block, the inter-block decision feedback signal vector being based on outputs of a previous block, a second segment having a decoupled intra-segment decision feedback stage for evaluating all possible values of a second subset of the input signal vectors according to a set of M pre-assigned decision feedback signals to provide a set of M intra-block decision signal vectors each having M entries, and a parallel inter-segment decision feedback stage for processing each of the entries of the set of M intra-block decision signal vectors according to the outputs of the first subset to select an output for each of the set of M intra-block decision signal vectors.

Additional embodiments of the synchronous circuits provided by the present disclosure include a third segment having a decoupled intra-segment decision feedback stage for evaluating all possible values of a third subset of the input signal vectors according to a next set of M pre-assigned decision feedback signals to provide a next set of M intra-block decision signal vectors each having M entries, and a parallel inter-segment decision feedback stage for processing each of the entries of the next set of M intra-block decision signal vectors according to the outputs of the second subset to select an output value for each of the next set of M intra-block decision signal vectors.

In yet a further aspect, the first segment is a MUX chain.

In another aspect, the decoupled intra-segment decision feedback stages are M parallel MUX chains and the inter-block decision feedback stages are parallel MUX's, each corresponding to a pre-assigned decision feedback signal.

In additional embodiments, the circuits and methods provided by the present disclosure may apply to a decision feedback equalizer, a decision feedback decoder, or a differential pulse code modulation circuit.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for pipelining and decoupling block decision feedback MUX loop in parallel processing decision feedback circuits.

Embodiments of the present disclosure may enable large block size and high clock frequency in parallel processing decision feedback circuits. Modern digital communication systems operate at GHz clock frequent and process large blocks of data in parallel to meet the growing demand for high speed and throughput. One of the major challenges in the design of a parallel processing decision feedback circuit is that both the block size and clock frequency are limited by the latency of a block decision feedback loop. Using pre-computation based parallel processing techniques, all possible decision values of different branches are pre-computed and then final decision values are selected using a block decision feedback MUX loop. This way, a decision feedback loop is reduced to a block decision feedback MUX loop. Since the selection of a possible decision value in the current block depends not only on the preceding decisions in the same block but also on the decisions of the past block in the previous clock cycle, both inter-block dependency and intra-block dependency exist in the processing of a block decision feedback MUX loop. The inter-block dependency and the intra-block dependency together leads to intra-clock-cycle dependency. It prevents the pipelining of a decision feedback MUX loop and thus the overall latency of a decision feedback MUX loop must be less than one clock period. This limits both the clock frequency and the block size of parallel processing decision feedback circuits, which, in turn, limits system speed and throughput. It is of great interest to decouple and pipeline a block decision feedback MUX loop to reduce its loop latency and iteration bound.

Embodiments of the present disclosure may also enable cost-effective and power-efficient integrated circuit design. In integrated circuit design, it is desirable to optimize a design with power and area. If timing-critical paths exist in a block decision feedback MUX loop, a design needs to be optimized with the speed of the block decision feedback MUX loop rather than power and area. Low-speed cells with less leakage power are replaced with high-speed cells in order to meet timing constraints. In such a case, the power and area can increase explosively. The resulting design can be less power efficient and cost-effective.

Current state of the art in parallel decision feedback processing is represented by the following public domain publications, which are incorporated by reference in their entirety.

One improvement on the conventional parallel processing decision feedback equalizer is reported in *High-Performance VLSI Architecture of Decision Feedback Equalizer for Gigabit Systems*, by Lin et al, IEEE Transactions on Circuits and Systems II, vol. 53, no. 9, pp. 911-915, September 2006. Using the proposed two-stage pre-computation scheme, the decision feedback taps are split into two groups corresponding to two separately processed pre-computation stages. This way, less adders and decision units are required and thus hardware complexity is reduced. The disadvantage is that adders for the addition of pre-computed values and comparators for decision are in timing-critical paths. In addition, the iteration bound of decision feedback loops increase with the block size of parallel processing. This limits its application in high-speed parallel processing decision feedback circuits.

A parallel processing decision feedback equalizer is disclosed in U.S. Pat. No. 6,363,112 to Azadet et al. It is configured to first pre-compute all possible decision values using a decision tree structure, and then the final decision values are selected using a block decision feedback MUX loop. Since the pre-computations of candidate decision values of different branches are outside the decision feedback loop, a timing critical decision feedback loop is relaxed relative to the decision feedback loop in a conventional parallel processing decision feedback equalizer. However, it requires series-connected decision feedback MUX loops for parallel decision feedback processing. The decision feedback MUX loops cannot be pipelined and lead to timing-critical signal paths. Another embodiment of the parallel processing decision feedback equalizer with reduced hardware complexity is also described in U.S. Pat. No. 6,363,112 to Azadet et al. The speed of a decision feedback loop is traded with hardware complexity by keeping part of pre-computation in a decision feedback loop.

A number of look-ahead techniques have been proposed to speed up block decision feedback MUX loop in parallel processing decision feedback circuits. In U.S. Pat. No. 6,192,072 to Azadet et al, the impact of each decision of a branch on the decisions of subsequent branches is pre-computed by using parallel rows of look-ahead MUX processors. Since there is no dependency among MUX rows, pipeline stages can be inserted which shortens timing critical paths. Another class of look-ahead based techniques is to reduce the iteration bound and the inner loop bound of decision feedback loops, for example, see *Design of Multigigabit Multiplexer-Loop-Based Decision Feedback Equalizer*, by Parhi, IEEE Transactions on Very Large Scale Integration (VLSI) Systems, vol. 13, no. 4, pp. 489-493, April 2005. Using look-ahead techniques, the iteration bound and the inner loop bound of a decision feedback loop are reduced by transforming the feedback signals from the immediately preceding decisions to older decisions. A pipelining techniques based on look-ahead in conjunction with loop retiming is disclosed in U.S. Pat. No. 7,239,652 to Parhi. The disclosed techniques allow for higher data rates than is possible with a conventional MUX loop for parallel processing decision feedback circuits. However, it requires significantly more MUXs and hardware complexity when the depth of look-ahead and the number of decision feedback taps increase.

Embodiments of the present disclosure may increase the operating clock frequency and the block size of a parallel processing decision feedback circuit, which, in turn, improves both the speed and the throughput of a parallel processing decision feedback circuit. In addition, it can enable the use of power efficient and cost-effective cells in integrated circuit design.

The decoupling and pipelining of decision feedback MUX loop techniques according to certain embodiments of the present disclosure have at least some of the following advantages. The intra-clock-cycle dependency among different branches in a block decision feedback MUX loop can be eliminated. Thus, the maximum applicable block size of parallel processing can be increased. The latency between two adjacent sampling flip-flops and the iteration bound of decision feedback loop can be reduced. Thus, the maximum applicable clock frequency can be increased. Synthesis optimization can enable the reduction of area and power rather than meeting timing. This can lead to the use of power efficient and cost-effective cells, which, in turn, reduce the overall power and cost of a device.

Pipelined Block Decision Feedback MUX Loop

In the following exemplary description, the symbols to be detected by a parallel processing decision feedback circuit are assumed to be binary, i.e., chosen from an alphabet of size A=2 but one of ordinary skill in the art will appreciate that the present disclosure can be extended to alphabets of arbitrary size, so the described examples are not intended to be limiting in any way.

Figure 2:
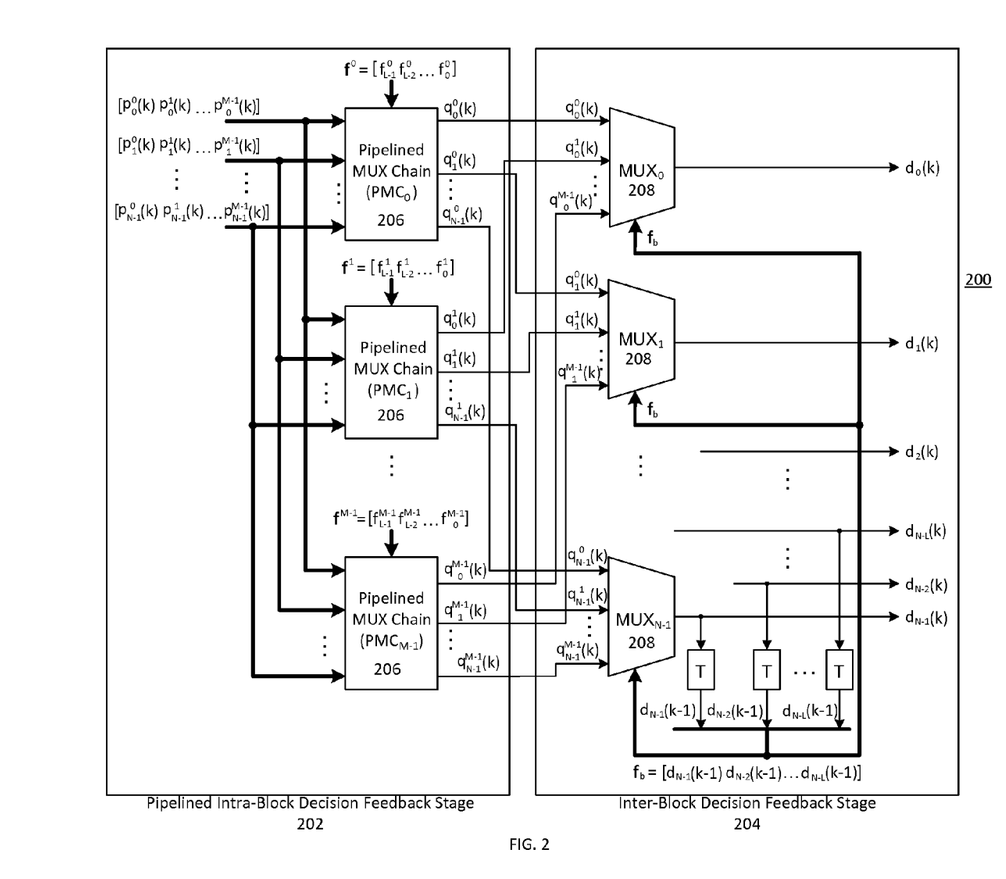
FIG. 2 is a block diagram of a pipelined block decision feedback circuit according to one embodiment of the present disclosure.

FIG. 2 illustrates an embodiment of a pipelined block decision feedback MUX loop 200, that can be used, for example, for timing-critical applications requiring high speed and throughput. As shown in FIG. 2, a pipelined block decision feedback MUX loop 200 consists of two MUX stages, i.e., a pipelined intra-block decision feedback MUX stage 202, and an inter-block decision feedback MUX stage 204. The intra-block dependency and the inter-block dependency are handled separately in the two MUX stages. In the pipelined intra-block decision feedback MUX stage 202, inter-block dependency is eliminated so that the pre-selection of decision values can be processed without requiring decisions of the block in the previous clock cycle. Parallel pipelined MUX chains (PMCs) 206 are used to transform the intra-block dependency into inter-block dependency so that the selection of a decision value in the inter-block decision feedback stage 204 is completely independent from other decisions in the same block of data.

In the parallel inter-block decision feedback stage 204, inter-block dependency is handled. Parallel MUXs 208 are used to select the final decision output values based on inter-block decision feedback signals which are the last L decisions of the block in the previous clock cycle. Since the intra-block decision feedback pre-selection is completed in the intra-block decision feedback MUX stage 202, the selection of final decision output values of different branches in the inter-block decision feedback stage 204 depends only on inter-block decision feedback signals and can be parallelized. Accordingly, a block decision feedback MUX loop 200 can be fully pipelined and the intra-clock-cycle dependency can be eliminated. The iteration bound of a pipelined block decision feedback MUX loop can be reduced to the delay of a single M-to-1 MUX where $M=2^L$ represents the number of candidate values of a decision.

Generally stated, a pipelined intra-block decision feedback stage 202 contains M PMCs 206. Each PMC 206 can evaluate possible values of an input signal vector according to one of several pre-assigned decision feedback signals (discussed more fully below) to select a value of an intra-block decision signal vectors.

More particularly, PMCs 206 process N sets of pre-computed input signal vectors taken from the input signal values, i.e., $p_0(k)=[p_0^0(k)\ p_0^1(k)\ \ldots\ ,\ p_0^{M-1}(k)],\ p_1(k)=[p_1^0(k)\ p_1^1(k)\ \ldots,\ p_1^{M-1}(k)],\ \ldots,$
$p_{N-1}(k)=[p_{N-1}^0(k)\ p_{N-1}^1(k)\ \ldots,\ p_{N-1}^{M-1}(k)]$ where k is the discrete time index, or alternatively, the block index of parallel processing. Each pre-computed input signal vector $p_n(k)$ for n=0, 1, . . . , N−1 contains M pre-computed entries corresponding to M possible combinations of the L decisions immediately preceding it. Each PMC 206 performs intra-block decision feedback processing and pre-selects intra-block decision signal vectors, $q^m(k)$, based on one possible combination of the last L decisions of the previous block, i.e., decision feedback signal, or pre-assigned decision feedback signal vectors, $f^m=[f_{L-1}^m\ f_{L-2}^m,\ \ldots,\ f_0^m]$, for m=0, 1, . . . , M−1. Example decision feedback signals for M PMCs 206 are described in Table 1.

TABLE 1

Decision Feedback Signals for PMCs

| Index of PMC | Decision Feedback Signal |
|---|---|
| 0 | $f^0 = [0\ 0\ \ldots\ 0\ 0]$ |
| 1 | $f^1 = [0\ 0\ \ldots\ 0\ 1]$ |
| 2 | $f^2 = [0\ 0\ \ldots\ 1\ 0]$ |
| ... | ... |
| M − 1 | $f^{M-1} = [1\ 1\ \ldots\ 1\ 1]$ |

The pre-computed input signal vectors $p_0(k)\ p_1(k)\ \ldots,\ p_{N-1}(k)$ are evaluated in the intra-block decision feedback stage 202 and mapped into M sets of intra-block, or "pre-selected", decision signal vectors, i.e., $q^0(k)=[q_0^0(k)\ q_1^0(k)\ \ldots\ ,\ q_{N-1}^0(k)],\ q^1(k)=[q_0^1(k)\ q_1^1(k)\ \ldots,\ q_{N-1}^1(k)],\ \ldots,$
$q^{M-1}(k)=[q_0^{M-1}(k)\ q_1^{M-1}(k)\ \ldots,\ q_{N-1}^{M-1}(k)].$ The nth entry $q_n^m(k)$ of vector $q^m(k)$, for m=0, 1, . . . , M−1, represents the corresponding decision value of final decision output value $d_n$ if the last L decisions from the previous block are $f^m$.

Figure 3A:
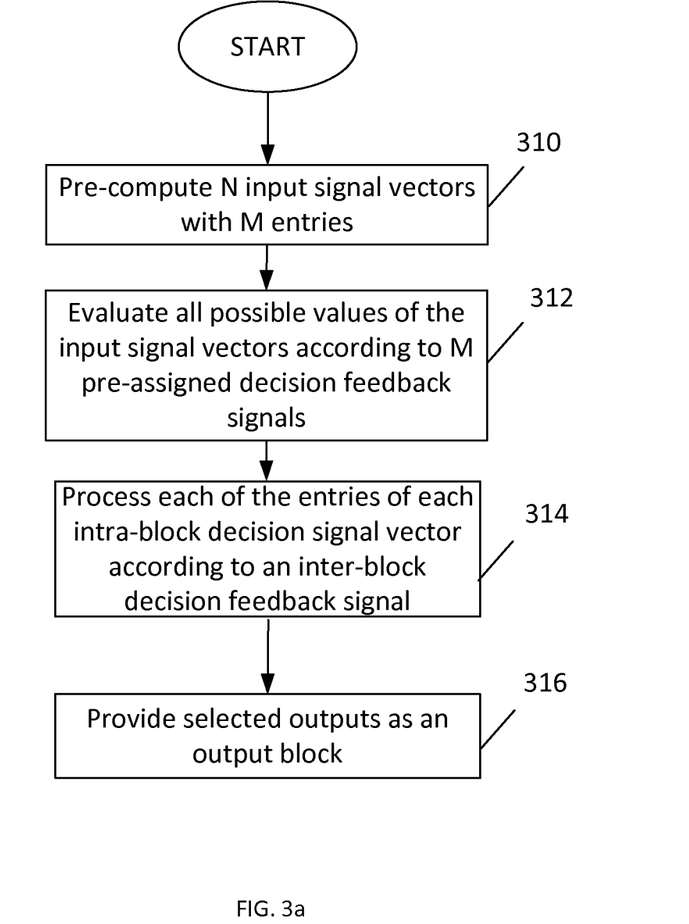
FIG. 3a is a flowchart illustrating a method of parallel processing in a pipelined block decision feedback circuit according to certain embodiments of the present disclosure.

FIG. 3a provides a high-level overview of a parallel processing method using a pipelined MUX loop according to certain embodiments of the present disclosure. For an input block of N branches, N input signal vectors each having M entries, are computed at 310, where each entry may be a possible value of one of the N branches. Then, at 312, all possible values of the input signal vectors are evaluated according to a set of M pre-assigned decision feedback signals to provide M intra-block decision signal vectors. Each intra-block decision signal vector may have N entries.

At 314, each of the entries of each of the intra-block decision signal vectors are processed according to an inter-block decision feedback signal to select N outputs for the input block. As discussed above, the inter-block decision feedback signal can be based on outputs for a previous block. Then, at 316, N outputs for the input block are provided as an output block.

According to certain embodiments, these outputs can then be provided as an inter-block decision feedback signal for an input block to be processed in future clock cycles.

Figure 3B:
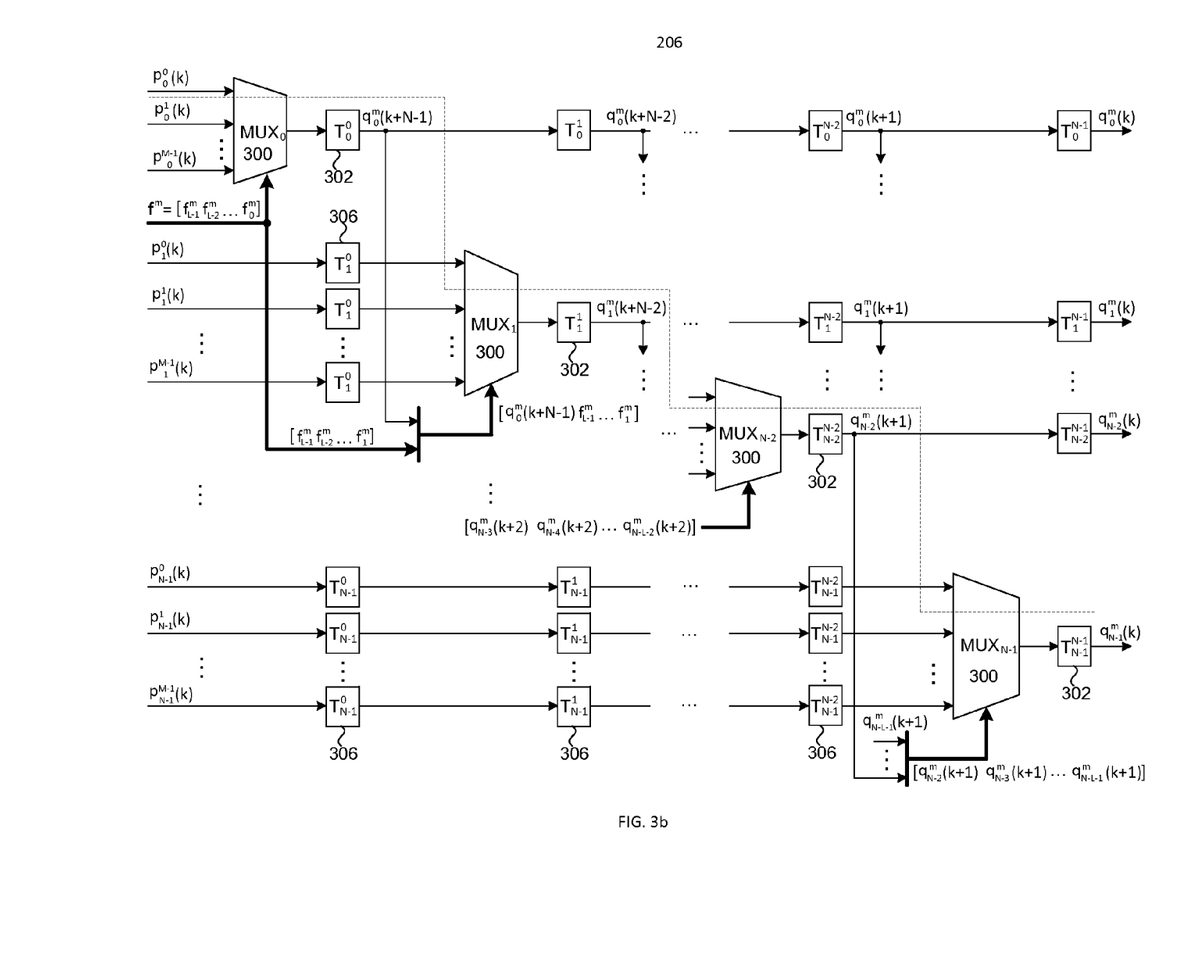
FIG. 3b is a block diagram of a pipelined MUX chain according to certain embodiments of the present disclosure.

As shown in FIG. 3b, a PMC 206 comprises a chain of M-to-1 MUXs 300. Each MUX 300 selects one signal from M pre-computed possible decision values based either on the decision feedback signal vectors $f^m$ or L preceding MUX outputs. The selection signal of each MUX 300 in the mth fully pipelined PMC 206 for m=0, 1, . . . , M−1 is listed in Table 2.

TABLE 2

MUX Selection Signal in the mth PMC

| Index of MUX | MUX Selection Signal |
|---|---|
| 0 | $f^m = [f_{L-1}{}^m\, f_{L-2}{}^m \ldots f_0{}^m]$ |
| 1 | $[q_0{}^m(k+N-1)\, f_{L-1}{}^m \ldots f_1{}^m]$ |
| 2 | $[q_1{}^m(k+N-2)\, q_0{}^m(k+N-2)\, f_{L-1}{}^m \ldots f_2{}^m]$ |
| . . . | . . . |
| M − 2 | $[q_{N-3}{}^m(k+2)\, q_{N-4}{}^m(k+2) \ldots q_{N-L-2}{}^m(k+2)]$ |
| M − 1 | $[q_{N-2}{}^m(k+1)\, q_{N-3}{}^m(k+1) \ldots q_{N-L-1}{}^m(k+1)]$ |

In this manner, certain embodiments update the selection signal, also referred to as a pre-assigned decision feedback signal, to incorporate decisions from preceding MUX's in the chain. PMC 206 can therefore evaluate possible values of one of the input signal vectors according to an "updated" decision feedback signal to select a next value of the one of the intra-block decision signal vectors.

PMCs 206 are pipelined to reduce the latency between two sampling flip-flops and ease timing critical paths. Depending on the specific speed requirements of a block decision feedback MUX loop, N optional pipeline delay units such as D flip-flops, $T_0{}^0\, T_1{}^1 \ldots, T_{N-1}{}^{N-1}$ 302, are inserted into the timing-critical intra-block decision feedback path as shown in the dashed lines in FIG. 3b. Pipeline delays 306 are also inserted into the forward paths of a PMC 206 to align MUX selection signals and pre-computed input signals at the input of a MUX 300.

As shown in FIG. 3b, if delay unit $T_0{}^0$ is inserted into the intra-block decision feedback path, then additional M delay units of $T_1{}^0$ are required to align or synchronize the pre-computed input signals $p_1{}^0(k)\, p_1{}^1(k) \ldots, p_1{}^{M-1}(k)$ and the MUX selection signal $q_0{}^m(K+N-1)$ at the input of $MUX_1$. In addition, delay units of $T_2{}^0\, T_3{}^0 \ldots, T_{N-1}{}^0$ are also required to align or synchronize the pre-computed input signals of the subsequent MUXs in the chain. In this manner, the PMCs 206 can synchronize the outputs of the selected values of the one of the intra-block decision signal vectors.

In general, the more timing-critical is a design, the more pipeline delay stages may be required. For moderate timing-critical applications, the number of pipeline stages can be reduced to save power and area. However, according to certain embodiments, the same number of pipeline delay stages are used in different PMCs 206 so that the intra-block decision signal vectors at the output of an intra-block decision feedback stage 202 are time-aligned and the same phase relationship as input is maintained.

Using fully pipelined PMCs 206 such that the intra-block decision feedback path of a PMC 206 has N pipeline stages, the intra-clock cycle dependency can be eliminated from a block decision feedback MUX loop. In such a case, the selection in the intra-block decision feedback stage 202 is independent from other MUX outputs in the same clock cycle. In addition, the iteration bound (or the maximum latency between two adjacent sampling flip-flops) is reduced by approximately N times and is approximately the latency of a single M-to-1 MUX. This enables a parallel processing decision feedback circuit 200 to operate at the highest clock frequency and the largest block size.

Referring again to FIG. 2, an inter-block decision feedback stage 204 consists of N parallel M-to-1 MUXs 208 to perform the inter-block decision feedback selection for N branches of an input data block. The M sets of intra-block decision signals from the intra-block decision feedback stage 202 are regrouped into N sets of inputs for the inter-block decision feedback stage, namely, the intra-block decision signal vectors:

$q_0(k)=[q_0{}^0(k)\, q_0{}^1(k) \ldots, q_0{}^{M-1}(k)]$, $q_1(k)=[q_0{}^1(k)\, q_1{}^1(k) \ldots, q_1{}^{M-1}(k)], \ldots,$
$q_{N-1}(k)=[q_{N-1}{}^0(k)\, q_{N-1}{}^1(k) \ldots, q_{N-1}{}^{M-1}(k)].$ The inter-block decision feedback signal vectors, $f_b(k)=[d_{N-1}(k-1)\, d_{N-2}(k-1) \ldots, d_{N-L}(k-1)]$ contain the last L decisions of the previous block delayed by one clock cycle. It is used by parallel MUXs 208 in the inter-block decision feedback stage 204 to select final output signal values $d_n(k)$ from the intra-block decision signal vectors, $q_0(k)\, q_1(k) \ldots, q_{N-1}(k)$. The selection of the nth output signal values n=0, 1, . . . , N−1 in the inter-block decision feedback stage 204 is described in Table 3.

TABLE 3

Inter-Block Decision Feedback Selection

| Inter-Block Decision Feedback Signal $f_b = [d_{N-1}(k-1)\, d_{N-2}(k-1) \ldots d_{N-L}(k-1)]$ | Selected Decision Signal $d_n(k)$ |
|---|---|
| [0 0 . . . 0 0] | $q_n{}^0(k)$ |
| [0 0 . . . 0 1] | $q_n{}^1(k)$ |
| [0 0 . . . 1 0] | $q_n{}^2(k)$ |
| . . . | . . . |
| [1 1 . . . 1 1] | $q_n{}^{M-1}(k)$ |

Decoupled Decision Feedback MUX Loop

A further embodiment of the present disclosure includes a decoupled block decision feedback MUX loop without requiring inserting additional pipeline stages described above with reference to FIG. 2. It is intended to speed up a block decision feedback MUX loop for moderately timing-critical applications and meanwhile keeping hardware complexity low. Using the disclosed technique, a block decision feedback MUX loop is decoupled into multiple segments (a process which is also referred to as "piecewise decoupling") such that each segment contains several parallel branches of a block. The first segment, which can be a MUX chain, performs inter-block decision feedback selection based on decisions in the previous clock cycle. Each of the subsequent segments consists of a decoupled intra-segment decision feedback MUX stage (which may include M parallel MUX chains, as discussed below) and a parallel inter-segment decision feedback MUX stage to handle intra-segment dependency and inter-segment dependency separately. MUX chains (MCs) are used to decouple the dependency between two adjacent segments and parallelize the intra-segment pre-selection of different segments.

Using the disclosed decoupling technique according to certain embodiments, the selections in intra-segment decision feedback MUX stages of different segments are independent from each other and processed in parallel. Different branches in each inter-segment decision feedback MUX stage for the selection of final decision values are fully parallelized. Though the inter-segment decision feedback MUX stages of different segments are series connected and thus not fully parallelized as in the pipelined block decision feedback MUX loop in the embodiment described above with reference to FIG. 2, the latency of a decoupled block decision feedback MUX loop can still be significantly reduced as compared to a conventional block decision feedback MUX loop. In addition, the iteration bound is reduced to $(2\sqrt{N}-1)\tau_{MUX}$ where $\tau_{MUX}$ is the latency of a M-to-1 MUX.

Figure 4A:
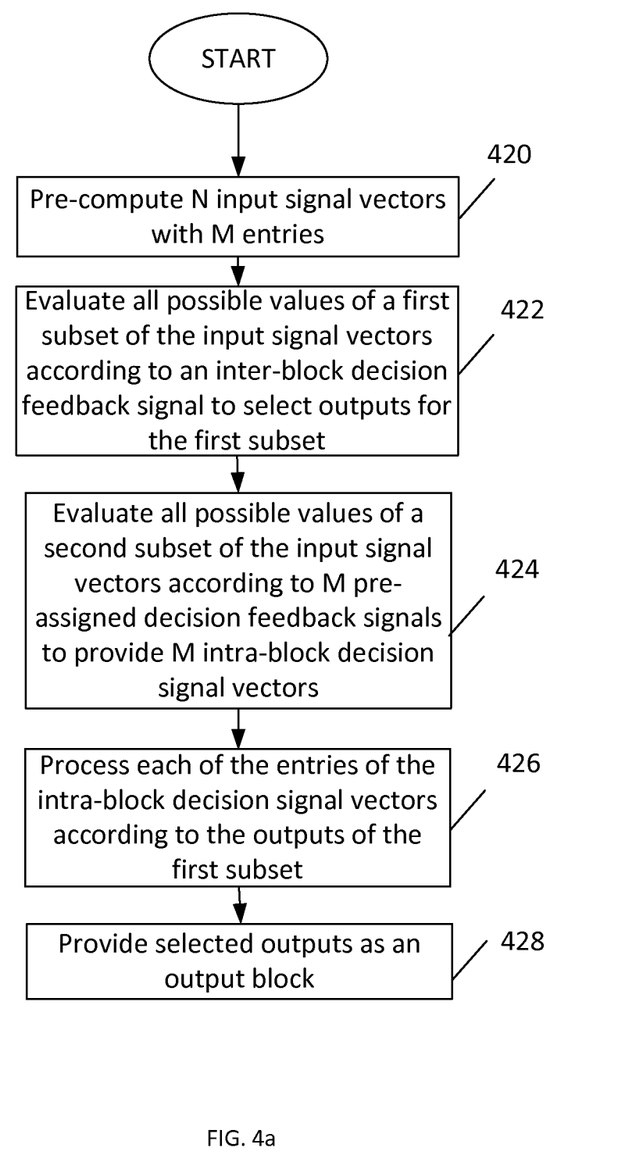
FIG. 4a is a flowchart illustrating a method of parallel processing in a decoupled decision feedback MUX loop according to certain embodiments of the present disclosure.

FIG. 4a provides a high-level overview of a parallel processing method using a decoupled decision feedback MUX loop according to certain embodiments of the present disclosure. For an input block of N branches, N input signal vectors each having M entries, are computed at 420, where each entry may be a possible value of one of the N branches. Then, at 422, all possible values of a first subset of the input signal vectors are evaluated according to an inter-block decision feedback signal vector to select outputs for this first subset. As discussed above, the inter-block decision feedback signal vector may be based on outputs of a previous block. At 424, all possible values of a second subset of the input signal vectors are evaluated according to a set of M pre-assigned decision feedback signals to provide a set of M intra-block decision signal vectors each having M entries. Each of the entries of the intra-block decision signal vectors are processed at 426 according to the outputs of the first subset to select an output for each of the set of M intra-block decision signal vectors. In certain embodiments, the selected outputs for each of the N input signal vectors can then be provided 428 as an output block.

Figure 4B:
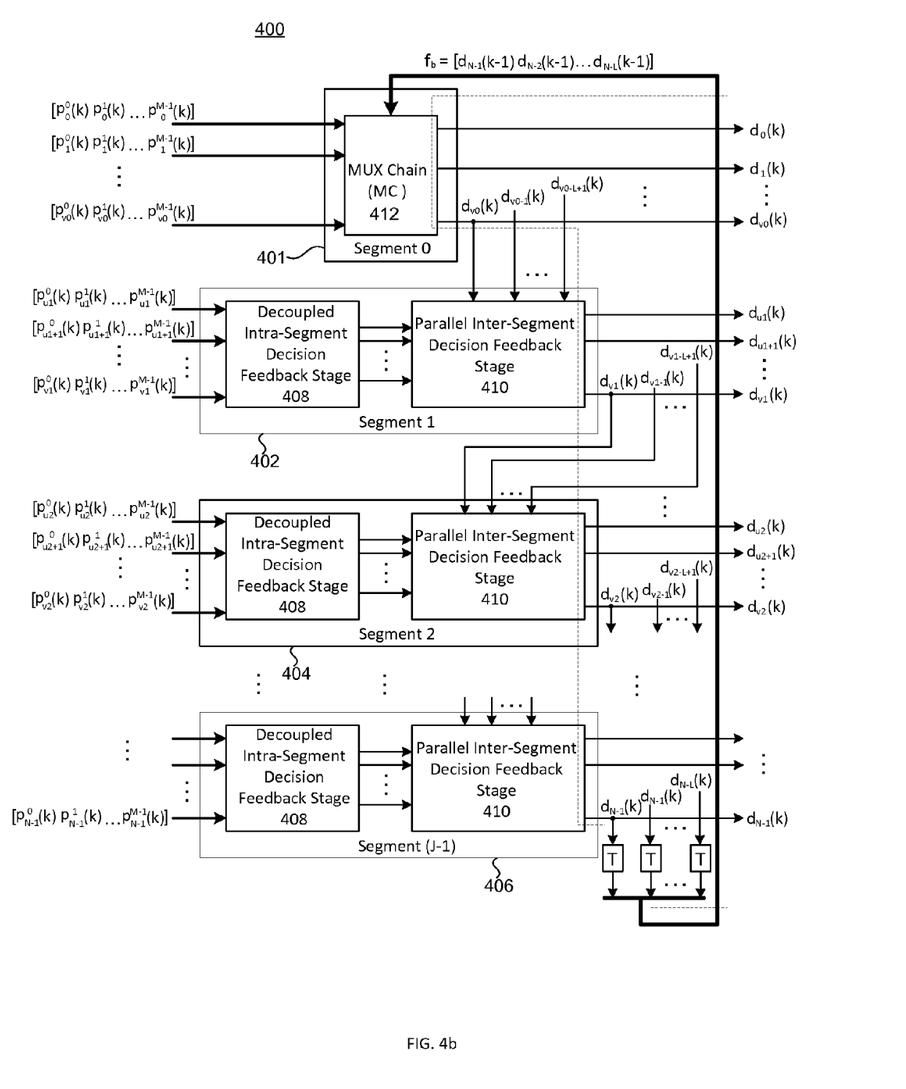
FIG. 4b is a block diagram of a decoupled decision feedback MUX loop according to yet another embodiment of the present disclosure.

As can be seen from the example embodiment shown in FIG. 4b, the decision feedback MUX loop 400 is decoupled into J segments 401, 402, 404, 406. In general, the number of segments 401, 402, 404, 406 is in the range of $$2 \leq J \leq \sqrt{N} \quad (4)$$

Large values of J lead to less latency of a decoupled block decision feedback loop 400 but increased complexity. The value of J can be determined by the specific speed requirement of an application. The first segment 401 of a decoupled decision feedback MUX loop comprises a single MUX chain (MC) 412. Different from the first segment 401, each of subsequent segments 402, 404, 406 incorporates two MUX stages: a decoupled intra-segment decision feedback MUX stage 408 and a parallel inter-segment decision feedback MUX stage 410.

Assume the indexes of the first branch and the last branch in a segment are u and v, respectively. Note that, in FIG. 4b, u1 and u2 are the indexes of the first branch in segment 1 and segment 2, respectively, while v0, v1 and v2 are the indexes of the last branch in segment 0, segment 1 and segment 2, respectively.

Figure 5:
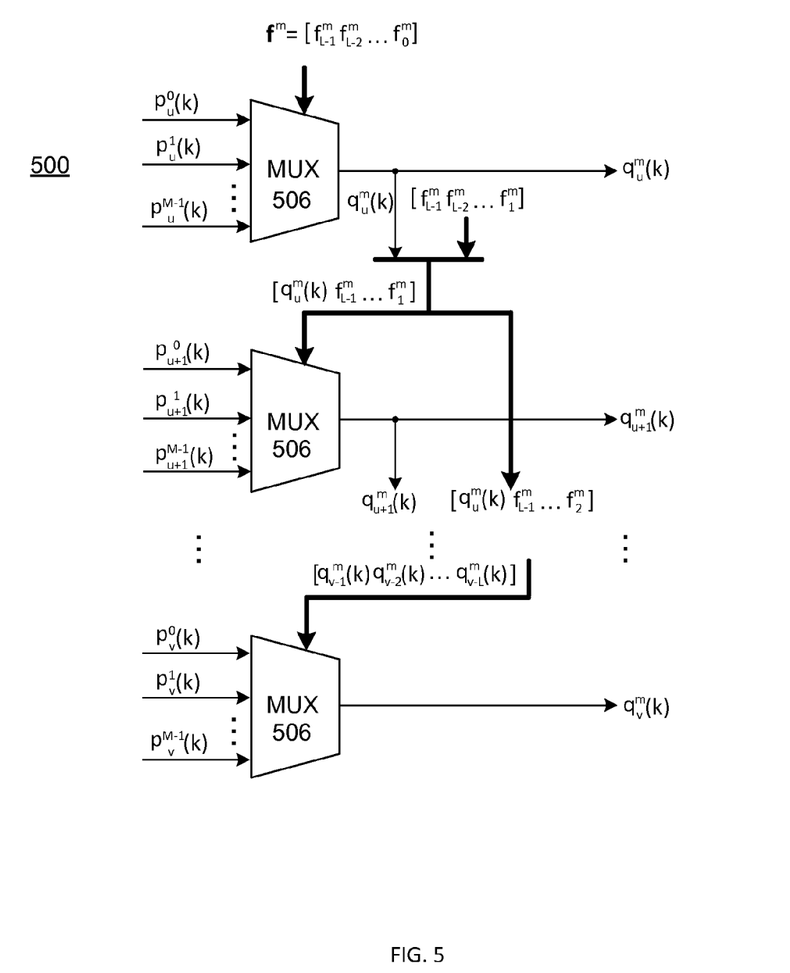
FIG. 5 is a MUX chain in a decoupled decision feedback MUX loop according to yet another embodiment of the present disclosure.

A block diagram of the mth MC, for m=0, 1, . . . , M-1, according to some embodiments is shown in FIG. 5. Each MC 500 consists of (v-u+1) number of M-to-1 MUXs 506. It performs the intra-segment decision feedback processing and pre-select (v-u+1) candidate signals for (v-u+1) branches of a segment, i.e., $q_u^m(k)$, $q_{u+1}^m(k)$ . . . , $q_v^m(k)$, from the pre-computed input signal vectors, $p_u(k)=[p_u^0(k)\ p_u^1(k)\ \ldots,\ p_u^{M-1}(k)]$, $p_{u+1}(k)=[p_{u+1}^0(k)\ p_{u+1}^1(k)\ \ldots,\ p_{u+1}^{M-1}(k)]$, . . . ,
$p_v(k)=[p_v^0(k)\ p_v^1(k)\ \ldots,\ p_v^{M-1}(k)]$.

The first segment 401 uses the inter-block decision feedback signal, i.e., $f_b=[d_{N-1}(k-1)\ d_{N-2}(k-1)\ \ldots,\ d_{N-L}(k-1)]$ from the previous block to perform inter-block decision feedback selection as well as intra-block decision feedback selection. In segments 2 404 to (J-1) 406, intra-segment dependency and inter-segment dependency are handled separately in the decoupled intra-segment decision feedback stage and the parallel inter-segment decision feedback stage, respectively.

Figure 6:
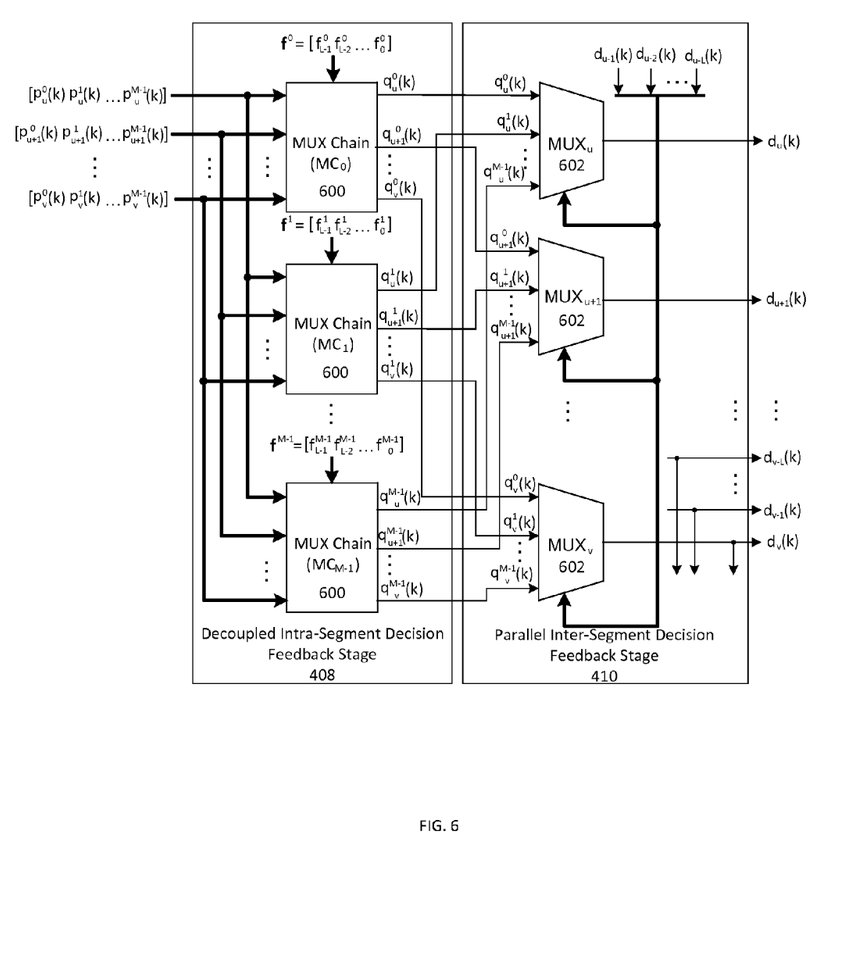
FIG. 6 is an exemplary segment of a decoupled decision feedback MUX loop according to yet another embodiment of the present disclosure.

FIG. 6 shows an example of a single segment according to some embodiments. Each decoupled intra-segment decision feedback stage 408 of a segment consists of M parallel MCs 600 which are completely decoupled from decisions of other segments as well as the decisions of the previous block. Each MC 600 performs intra-segment decision feedback pre-selection based on one combination of the last L decisions of the previous block. These decisions may be provided as pre-assigned decision feedback signals i.e., $f^0=[f_{L-1}^0\ f_{L-2}^0,\ \ldots,\ f_0^0]=[0\ 0\ \ldots\ 0]$, $f^1=[f_{L-2}^1\ f_{L-2}^1,\ \ldots,\ f_0^1]=[0\ 0\ \ldots\ 1]$, . . . ,
$f^{M-1}=[f_{L-1}^{M-1}\ f_{L-2}^{M-1},\ \ldots,\ f_0^{M-1}]=[1\ 1\ \ldots\ 1]$.

The outputs of the intra-segment decision feedback MUX stage of the jth segment, for j=2, 3, . . . , J-1, are regrouped into (v-u+1) sets of pre-selected, or intra-block, decision signal vectors, i.e., $q_u(k)=[q_u^0(k)\ q_u^1(k)\ \ldots,\ q_u^{M-1}(k)]$, $q_{u+1}(k)=[q_{u+1}^0(k)\ q_{u+1}^1(k)\ \ldots,\ q_{u+1}^{M-1}(k)]$, . . . ,
$q_v(k)=[q_v^0(k)\ q_v^1(k)\ \ldots,\ q_v^{M-1}(k)]$, and passed to the parallel inter-segment decision feedback MUX stage 410. The inter-segment decision feedback stage 410 consists of (v-u+1) number of M-to-1 MUXs 602 that operate in parallel without requiring decisions of other branches in the same segment. Each parallel MUX may also correspond to a pre-assigned decision feedback signal.

Each M-to-1 MUX 602 selects 1 of M inputs as the final output signal value based on the last L decisions from the preceding segment, i.e., $d_{u-1}(k)$, $d_{u-2}(k)$ . . . , $d_{u-L}(k)$.

The number of branches in the jth segment or segment size s, for j=0, 1, . . . , J-1, is chosen such that the latency of the most timing-critical path (as shown in dashed line in FIG. 4b) can be reduced. Given the number of segments, i.e., $J=\sqrt{N}$, a possible segment size is given in Table 4.

TABLE 4

| Segment Size |
| --- |
| $s_0 = \left\lceil \dfrac{\sqrt{N}+1}{2} \right\rceil$ |
| $s_1 = s_0 + 1$ |
| ... |
| $s_{J-2} = s_{J-3} + 1$ |
| $s_{J-1} = N - \sum_{j=0}^{J-2} s_j$ |

The segment size in Table 4 is intended to minimize the latency of timing critical path as well as iteration bound of a decoupled block decision feedback MUX loop 400. Using the preferred number of segment J and segment sizes, the iteration bound of a block decision feedback MUX loop 400 can be reduced to $(2\sqrt{N}-1)\tau_{MUX}$ where $\tau_{MUX}$ is the latency of a M-to-1 MUX. Depending on the specific requirements such as clock frequency, power, area, etc, of an application, those knowledgeable in the art may optimize the number of segments J and segment size to meet multiple design constraints. For example, in applications with less stringent timing requirements, J=2 can be the preferred number of segments. In addition, in case of J=2, the size of the second segment can be chosen to be smaller than the first segment to reduce the size of MCs, which, in turn, save the power and area of a chip.

The outputs from the parallel inter-segment decision feedback MUX stage 410 may be provided as a block of outputs for the input block, which, in turn may be used to generate an inter-block decision feedback signal to be used in subsequent blocks.

Generally stated, a method of parallel processing an input block of N branches using a decoupled decision feedback MUX loop can include the pre-computing N input signal vectors each having M entries, each entry being a possible value of one of the N branches. In other words, the pre-computation step proceeds as discussed above with respect to the pipelined block decision feedback MUX loop. However, in a "decoupled" embodiment, all possible values of a first subset of the input signal vectors are evaluated according to an inter-block decision feedback signal vector to select outputs for the first subset of the input block. The inter-block decision feedback signal vector may also be based on outputs of a previous block. Then, all possible values of a second subset of the input signal vectors are evaluated according to a set of M pre-assigned decision feedback signals to provide a set of M intra-block decision signal vectors each having M entries. Each of the entries of the set of M intra-block decision signal vectors are then processed according to the outputs of the first subset to select an output for each of the set of M intra-block decision signal vectors.

Similar to the PMC's discussed with respect to FIG. 3b above, evaluating all possible values of the second subset of the input signal vectors generally involves evaluating possible values of one of the subset of input signal vectors according to a pre-assigned decision feedback signals to select a first value of one of the set of intra-block decision vectors. Then, the pre-assigned decision feedback signal may be updated to incorporate the output value from the first segment, and then possible values of a next input signal vectors can be evaluated according to the updated feedback signal to select a next value of the one of the intra-block decision signal vectors. In this same manner, a third segment may be used to evaluate all possible values of a third subset to select an output for a next set of intra-block decision signal vectors.

The outputs may then be synchronized so as to provide them as an output block corresponding to the processed input block.

Parallel processing decision feedback equalization (DFE) is widely used in high-speed data communication systems such as backplane routing and optical communications. The growing demand for higher data rate has driven up both the operating clock frequency and the block size of parallel processing. How to design a DFE that can operate at high clock frequency and process large block of data in parallel has become a major challenge.

The functional detail of this embodiment is given using the example of a parallel processing decision feedback equalizer for communication link over an electrical wired channel. However, the applicability of the present disclosure can be extended to many other systems involving a decision feedback circuit processing a block of data in parallel. Other examples include, decision feedback decoder, differential pulse code modulation, etc.

Figure 7:
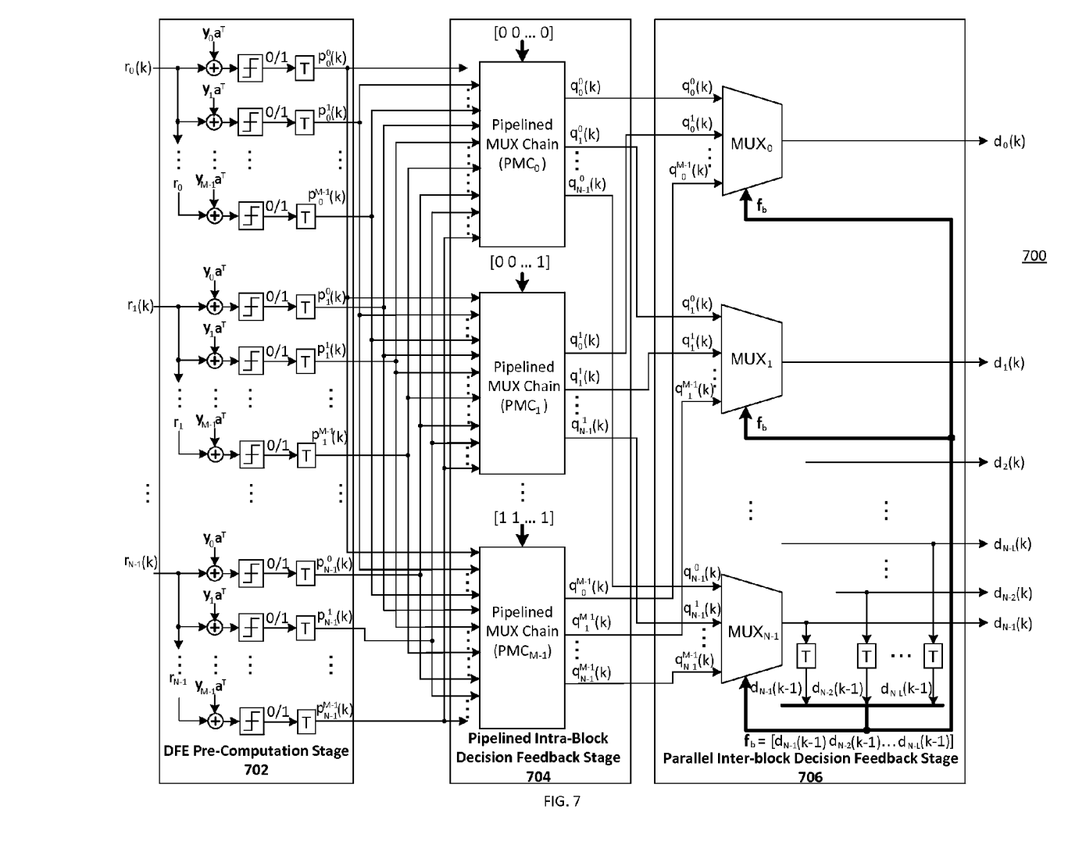
FIG. 7 is a schematic of an exemplary decision feedback equalizer according to another embodiment.

FIG. 7 is a schematic of an exemplary DFE 700 that incorporates a pipelined decision feedback MUX loop described above in accordance with one embodiment. The functional detail is given using the example of non-return-to-zero (NRZ) signal over an electrical wired channel. The illustrated embodiment of the DFE 700 includes a pre-computation stage 702, a pipelined intra-block decision feedback stage 704, and a parallel inter-block decision feedback stage 706. In the pre-computation stage 702, a block of received NRZ signals $r_0(k), r_1(k), \ldots, r_{M-1}(k)$ are pre-equalized. M possible decision values $p_n^0(k) p_n^1(k) \ldots, p_n^{M-1}(k)$ of input signals $r_n$ for $n=0, 1, \ldots, N-1$ are pre-computed based on M possible combinations of L decision feedback signals, i.e., $y_0=[1\ 1 \ldots 1], y_1=[-1\ 1 \ldots 1], \ldots, y_{M-1}=[-1\ -1 \ldots -1]$. The mth pre-computed signal for nth input NRZ signal $r_n$ is given by $$q_n^m = \begin{cases} 1 & \text{if } r_n + y_m a^T \geq 0 \\ 0 & \text{if } r_n + y_m a^T < 0 \end{cases} \quad (5)$$

where DFE tap vector $a=[a_0\ a_1 \ldots a_{L-1}]$ contains L entries of decision feedback equalization coefficients. As described above, the pipelined intra-block decision feedback stage 704 performs pipelined intra-block decision feedback pre-selection and transforms the intra-block dependency into inter-block dependency. The inter-block decision feedback stage 706 selects the final DFE outputs in parallel based on L decisions of the block in the previous clock cycle, namely the inter-block decision feedback signal, i.e., $f_b(k)=[d_{N-1}(k-1)\ d_{N-2}(k-1) \ldots, d_{N-L}(k-1)]$.

As one of ordinary skill in the art will appreciate, the methods and synchronous circuitry according to any of the embodiments described herein can be applied to any appropriate processing circuits that include, but are not limited to, a decision feedback equalizer, a decision feedback decoder or a differential pulse code modulation circuit.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A computer-implemented method of parallel processing digital input signal vectors of an input block of a synchronous decision feedback circuit, the input block having N branches, the computer-implemented comprising:

pre-computing N input signal vectors each having M entries, each entry being a possible value of one of the N branches;

evaluating all possible values of the input signal vectors according to a set of M pre-assigned decision feedback signals to provide M intra-block decision signal vectors, each intra-block decision signal vector having N entries; and processing each of the entries of each of the intra-block decision signal vectors according to an inter-block decision feedback signal to select N outputs for the input block, the inter-block decision feedback signal being based on outputs for a previous block.

2. The computer-implemented method of claim 1, further comprising outputting the selected N outputs for the input block as an output block.

3. The computer-implemented method of claim 2, wherein evaluating all possible values of the input signal vectors comprises:

evaluating possible values of one of the input signal vectors according to one of the pre-assigned decision feedback signals to select a first value of one of the intra-block decision signal vectors;

updating the one of the pre-assigned decision feedback signals to incorporate the first value; and evaluating possible values of a next one of the input signal vectors according to the updated pre-assigned decision feedback signal to select a next value of the one of the intra-block decision signal vectors.

4. The computer-implemented method of claim 3, further comprising repeating the steps of updating the pre-assigned decision feedback signal and evaluating possible values of a next one of the input signal vectors for each of the input signal vectors.

5. The computer-implemented method of claim 4, further comprising synchronizing the outputs of the selected values of the one of the intra-block decision signal vectors.

6. The computer-implemented method of claim 5, further comprising generating a next inter-block decision feedback signal based on the outputs for the input block.

7. A synchronous circuit for parallel processing digital input signal vectors of an input block having N branches, comprising:

a pre-computation stage for pre-computing N input signal vectors each having M entries, each entry being a possible value of one of the N branches;

a pipelined intra-block decision feedback stage for evaluating all possible values of the input signal vectors according to a set of M pre-assigned decision feedback signals to provide M intra-block decision signal vectors, each intra-block decision signal vector having N entries; and an inter-block decision feedback stage for processing each of the entries of each of the intra-block decision signal vectors according to an inter-block decision feedback signal to select N outputs for the input block, the inter-block decision feedback signal being based on outputs for a previous block.

8. The synchronous circuit of claim 7, wherein the pipelined intra-block decision feedback stage comprises M parallel MUX chains.

9. The synchronous circuit of claim 8, wherein the M parallel MUX chains are for evaluating possible values of one of the input signal vectors according to one of the pre-assigned decision feedback signals to select a first value of one of the intra-block decision signal vectors, updating the one of the pre-assigned decision feedback signals to incorporate the first value, and evaluating possible values of a next one of the input signal vectors according to the updated pre-assigned decision feedback signal to select a next value of the one of the intra-block decision signal vectors.

10. The synchronous circuit of claim 9, wherein the inter-block decision feedback stage comprises N parallel MUX's.

11. The synchronous circuit of claim 10, wherein the circuit is any one of a decision feedback equalizer, a decision feedback decoder or a differential pulse code modulation circuit.

12. A computer-implemented method of parallel processing digital input signal vectors of an input block of a synchronous decision feedback circuit, the input block having N branches, the computer-implemented comprising:

pre-computing N input signal vectors each having M entries, each entry being a possible value of one of the N branches;

evaluating all possible values of a first subset of the input signal vectors according to an inter-block decision feedback signal vector to select outputs for the first subset of the input signal vectors, the inter-block decision feedback signal vector being based on outputs of a previous block;

evaluating all possible values of a second subset of the input signal vectors according to a set of M pre-assigned decision feedback signals to provide a set of M intra-block decision signal vectors each having M entries;

processing each of the entries of the set of M intra-block decision signal vectors according to the outputs of the first subset to select an output for each of the set of M intra-block decision signal vectors.

13. The computer-implemented method of claim 12, further comprising outputting the selected outputs for each of the N input signal vectors as an output block.

14. The computer-implemented method of claim 13, wherein evaluating all possible values of the second subset of the input signal vectors comprises:

evaluating possible values of one of the subset of input signal vectors according to one of the set of pre-assigned decision feedback signals to select a first value of one of the set of intra-block decision vectors;

updating the one of the set of pre-assigned decision feedback signals to incorporate the first value; and evaluating possible values of a next one of the input signal vectors according to the updated pre-assigned decision feedback signal to select a next value of the one of the intra-block decision signal vectors.

15. The computer-implemented method of claim 14, further comprising synchronizing the outputs of the selected values of the one of the intra-block decision signal vectors.

16. The computer-implemented method of claim 15, further comprising repeating the steps of updating the pre-assigned decision feedback signal and evaluating possible values of a next one of the input signal vectors for each of the N input signal vectors.

17. The computer-implemented method of claim 16, further comprising:

evaluating all possible values of a third subset of the input signal vectors according to a next set of M pre-assigned decision feedback signals to provide a next set of M intra-block decision signal vectors each having M entries, and processing each of the entries of the next set of M intra-block decision signal vectors according to the outputs of the second subset to select an output for each of the next set of M intra-block decision signal vectors.

18. The computer-implemented method of claim 17, further comprising generating a next inter-block decision feedback signal based on the outputs for the input block.

19. A synchronous circuit for parallel processing digital input signal vectors of an input block having N branches, comprising:
- a pre-computation stage for pre-computing N input signal vectors each having M entries, each entry being a possible value of one of the N branches;
- a first segment for evaluating all possible values of a first subset of the input signal vectors according to an inter-block decision feedback signal vector to select output values for the first subset of the input block, the inter-block decision feedback signal vector being based on outputs of a previous block; and
- a second segment having
    - a decoupled intra-segment decision feedback stage for evaluating all possible values of a second subset of the input signal vectors according to a set of M pre-assigned decision feedback signals to provide a set of M intra-block decision signal vectors each having M entries, and
    - a parallel inter-segment decision feedback stage for processing each of the entries of the set of M intra-block decision signal vectors according to the outputs of the first subset to select an output for each of the set of M intra-block decision signal vectors.

20. The synchronous circuit of claim 19, further comprising a third segment having
- a decoupled intra-segment decision feedback stage for evaluating all possible values of a third subset of the input signal vectors according to a next set of M pre-assigned decision feedback signals to provide a next set of M intra-block decision signal vectors each having M entries, and
- a parallel inter-segment decision feedback stage for processing each of the entries of the next set of M intra-block decision signal vectors according to the outputs of the second subset to select an output for each of the next set of M intra-block decision signal vectors.

21. The synchronous circuit of claim 20, wherein the first segment is a MUX chain.

22. The synchronous circuit of claim 21, wherein the decoupled intra-segment decision feedback stages comprise M parallel MUX chains.

23. The synchronous circuit of claim 22, wherein the parallel inter-segment decision feedback stages comprise parallel MUX's, each corresponding to a pre-assigned decision feedback signal.

24. The synchronous circuit of claim 23, wherein the circuit is any one of a decision feedback equalizer, a decision feedback decoder or a differential pulse code modulation circuit.

* * * * *